United States Patent
Shiraishi et al.

(10) Patent No.: US 9,409,514 B2
(45) Date of Patent: Aug. 9, 2016

(54) LIGHT DEVICE WITH FRAME PROVIDED FOR HOLDING SWITCH OPERATING SECTION

(71) Applicant: Toshiba Lighting & Technology Corporation, Yokosuka-shi, Kanagawa-ken (JP)

(72) Inventors: Hiromitsu Shiraishi, Yokosuka (JP); Yohei Matsuda, Yokosuka (JP); Ryuji Tsuchiya, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 85 days.

(21) Appl. No.: 14/327,590

(22) Filed: Jul. 10, 2014

(65) Prior Publication Data
US 2015/0062942 A1 Mar. 5, 2015

(30) Foreign Application Priority Data
Aug. 28, 2013 (JP) .................. 2013-176468

(51) Int. Cl.
*B60Q 3/02* (2006.01)
*B60K 37/06* (2006.01)
*B60Q 3/00* (2006.01)

(52) U.S. Cl.
CPC .............. *B60Q 3/0203* (2013.01); *B60K 37/06* (2013.01); *B60Q 3/004* (2013.01); *B60Q 3/0279* (2013.01); *B60Q 3/0296* (2013.01); *B60K 2350/203* (2013.01); *B60K 2350/922* (2013.01)

(58) Field of Classification Search
CPC ............... B60K 2350/203; B60K 2350/922; B60K 37/06; B60Q 3/02; B60Q 3/0203; B60Q 3/0253; B60Q 3/0286; B60Q 3/0296; B60Q 3/06; B60Q 3/0209; B60Q 3/0279
USPC ................................. 362/471, 472, 488, 490
See application file for complete search history.

(56) References Cited

U.S. PATENT DOCUMENTS 5,557,081 A * 9/1996 Clevenger ............ B60Q 3/0296
200/16 C
5,791,772 A * 8/1998 Rickfelder ............. B60Q 3/004
362/329

(Continued)

FOREIGN PATENT DOCUMENTS

DE 29519317 U1 1/1996
DE 10259236 A1 7/2004

(Continued)

OTHER PUBLICATIONS

Jul. 29, 2015—(EP) Extended EP Search Report—App 14176045.4.

*Primary Examiner* — Anh Mai
*Assistant Examiner* — Steven Horikoshi
(74) *Attorney, Agent, or Firm* — Banner & Witcoff, Ltd.

(57) ABSTRACT

A lighting device is provided that includes: a light emitting section that has a light emitting element and a switch for controlling a lighting state of the light emitting element; a housing that stores the light emitting section and has one end section which is open; a translucent cover that covers the opening of the housing; and a frame that is provided between the housing and the cover. The frame includes an edge section that presents a frame shape and a holding section having one end provided in the edge section and the other end protruding from the edge section. The holding section holds an operation section operating the switch and is exposed from the cover.

16 Claims, 8 Drawing Sheets

(56) References Cited

U.S. PATENT DOCUMENTS

| | | | |
|---|---|---|---|
| 8,425,093 B2 | 4/2013 | Kino et al. | |
| 2001/0022730 A1* | 9/2001 | Nagata | B60Q 3/0203 362/490 |
| 2008/0074889 A1* | 3/2008 | Gloisten | B60Q 3/025 362/341 |
| 2010/0165650 A1 | 7/2010 | Kino et al. | |
| 2012/0014124 A1* | 1/2012 | Anderson | B60Q 3/004 362/509 |
| 2012/0015531 A1* | 1/2012 | Chiba | B60Q 3/0203 439/76.2 |

FOREIGN PATENT DOCUMENTS

| | | |
|---|---|---|
| JP | H09-240368 A | 9/1997 |
| JP | 2004-017931 A | 1/2004 |
| JP | 2009-067098 A | 4/2009 |
| JP | 2010-149762 A | 7/2010 |
| WO | 2012/111461 A1 | 8/2012 |

\* cited by examiner

LIGHT DEVICE WITH FRAME PROVIDED FOR HOLDING SWITCH OPERATING SECTION

CROSS-REFERENCE TO RELATED APPLICATIONS

This application is based upon and claims the benefit of priority from the prior Japanese Patent Application No. 2013-176468, filed on Aug. 28, 2013; the entire contents of which are incorporated herein by reference.

FIELD

Embodiments described herein relate to a lighting device.

BACKGROUND

There is a lighting device provided in an interior material of a vehicle and having a light emitting diode as a light source.

Such a lighting device includes a box-shaped housing, a substrate on which the light emitting diode is mounted and which is provided inside of the housing, a frame-shaped edge section that covers an opening portion of the housing, and an outer lens that covers an opening of the edge section.

Thus, an area (illumination area) of the outer lens becomes smaller depending on the amount of an edge of the edge section.

Furthermore, if a width dimension of the edge of the edge section is large, it is difficult to be merged into the design of the interior material of the vehicle.

BRIEF DESCRIPTION OF THE DRAWINGS

FIG. 4A is a schematic exploded cross-sectional view in a direction taken along line B-B in FIG. 3. FIG. 4B is a schematic exploded cross-sectional view in a direction taken along line C-C in FIG. 3.

FIG. 5A is a schematic exploded cross-sectional view illustrating before the mounting of the cover and the frame. FIG. 5B is a schematic cross-sectional view illustrating after the mounting of the cover and the frame.

DETAILED DESCRIPTION

Figure 1:
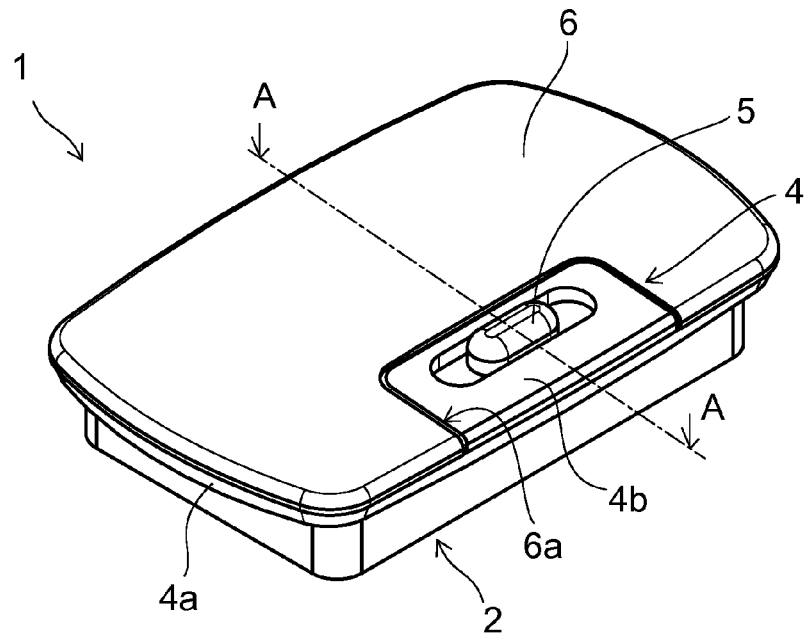
FIG. 1 is a schematic perspective view illustrating a lighting device according to an embodiment.

According to an embodiment, a lighting device includes: a light emitting section that has a light emitting element and a switch for controlling a lighting state of the light emitting element; a housing that stores the light emitting section and of which one end section is open; a cover that covers the opening of the housing and has translucency; and a frame that is provided between the housing and the cover. The frame includes an edge section that presents a frame shape and a holding section of which one end is provided in the edge section and the other end protrudes from the edge section, and which holds an operation section operating the switch and is exposed from the cover.

According to the lighting device, it is possible to increase an illumination area.

Furthermore, the cover may further have a light guide section extending toward the light emitting section.

By doing this way, it is possible for the light to effectively reach the vicinity of the periphery of the cover. Thus, it is possible to further increase the illumination area.

Furthermore, the frame may further include a connection section provided between the holding section and the edge section. The connection section may have a hole section passing through in a thickness direction. The cover may cover the connection section.

By doing this way, it is possible to minimize the light blocked by the holding section. Thus, it is possible to further increase the illumination area.

Furthermore, a side surface of the inside of the housing may be inclined in a direction in which the side of a bottom surface is close to the center of the housing.

By doing this way, the light incident on the side surface is easily to be emitted to the outside of the lighting device.

Hereinafter, an embodiment will be illustrated with reference to the drawings. Moreover, in each drawing, the same reference numerals are given to the same configuration elements and detailed descriptions thereof are appropriately omitted.

FIG. 1 is a schematic perspective view illustrating a lighting device 1 according to an embodiment.

Figure 2:
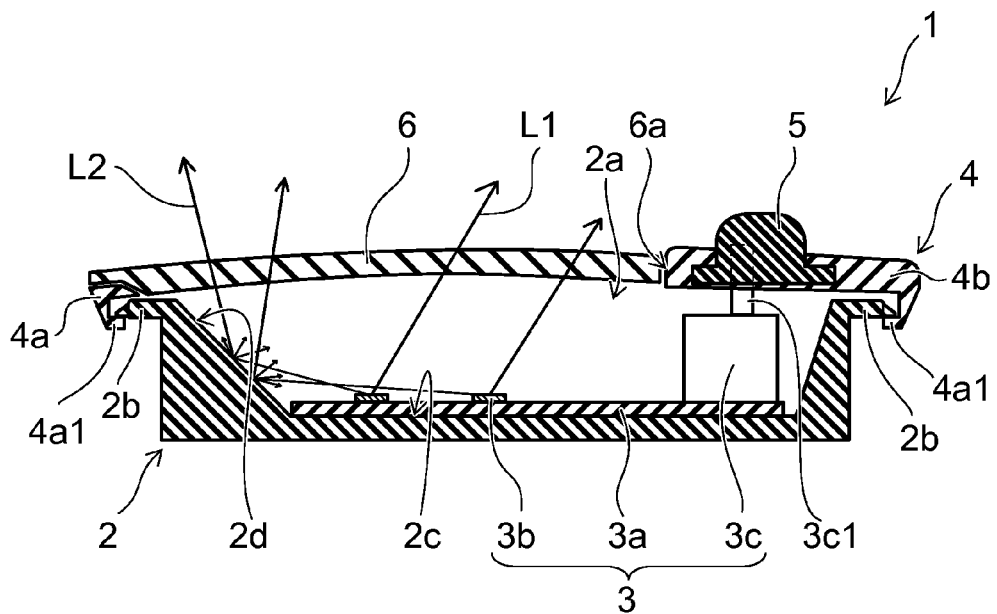
FIG. 2 is a schematic cross-sectional view in a direction taken along line A-A in FIG. 1.

FIG. 2 is a schematic cross-sectional view in a direction taken along line A-A in FIG. 1.

Figure 3:
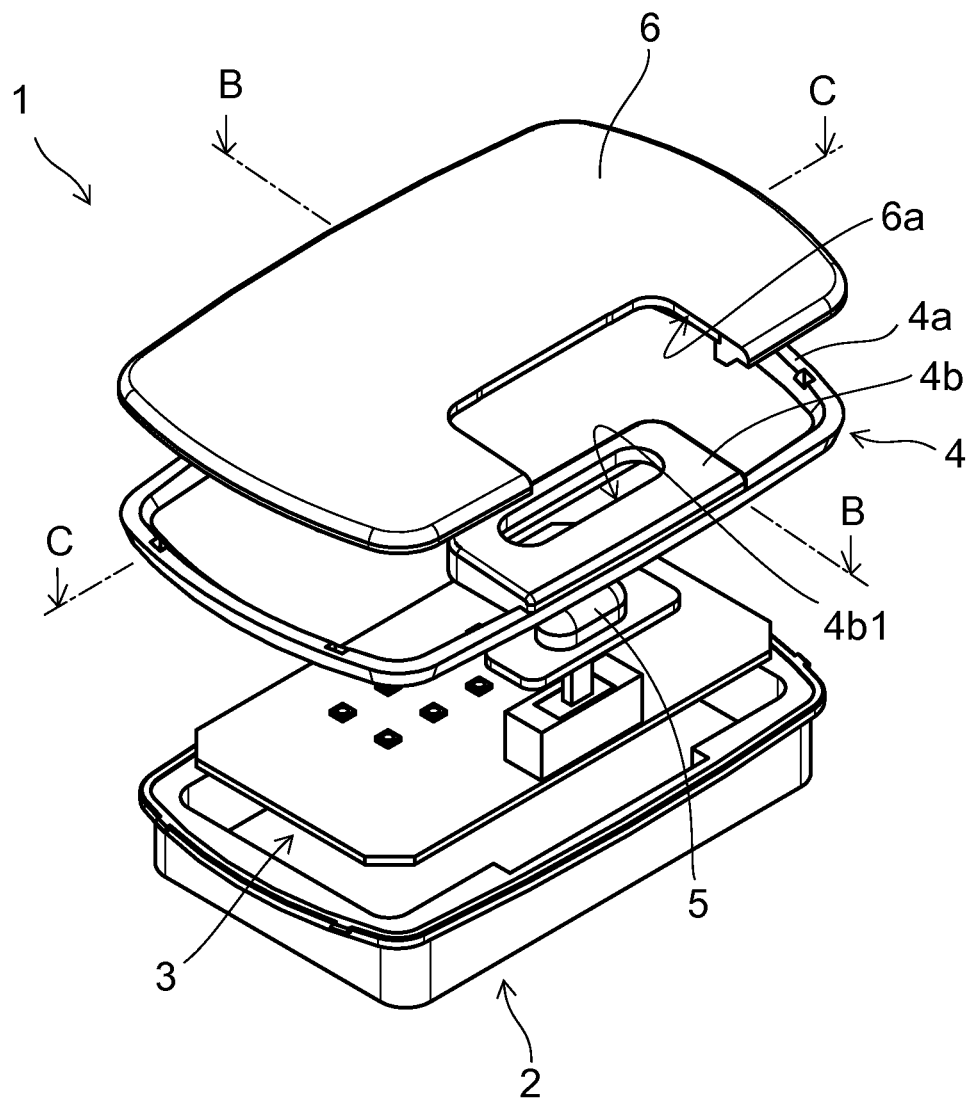
FIG. 3 is a schematic exploded view of the lighting device.

FIG. 3 is a schematic exploded view of the lighting device 1.

Figure 4A:
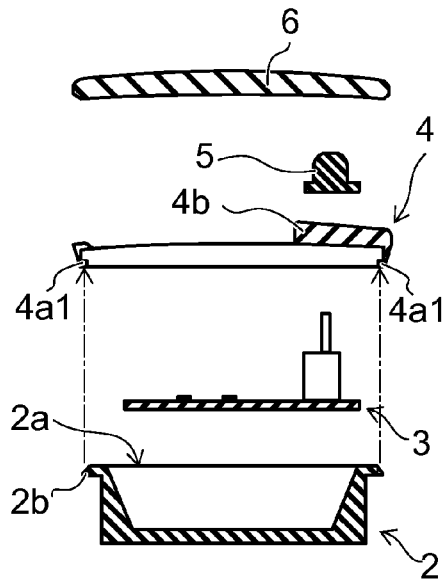
FIGS. 4A and 4B are schematic exploded cross-sectional views of the lighting device.
Figure 4B:
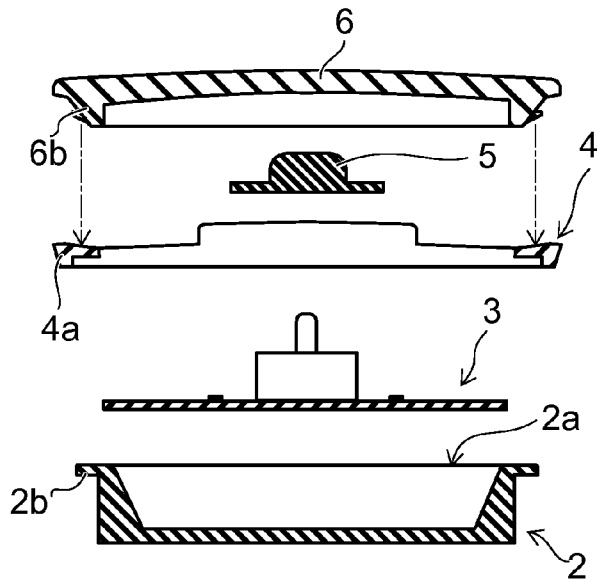

FIGS. 4A and 4B are schematic exploded cross-sectional views of the lighting device 1.

Moreover, FIG. 4A is a schematic exploded cross-sectional view in a direction taken along line B-B in FIG. 3. FIG. 4B is a schematic exploded cross-sectional view in a direction taken along line C-C in FIG. 3.

For example, the lighting device 1 may be provided in an interior of a vehicle such as an automobile or a railway vehicle.

For example, the lighting device 1 may be provided inside an opening that is provided in a roof trim or the like of a ceiling of a passenger compartment of the automobile.

As illustrated in FIGS. 1 to 4B, the lighting device 1 has a housing 2, a light emitting section 3, a frame 4, an operation section 5, and a cover 6.

As illustrated in FIG. 2, the housing 2 presents a box-shape and one end section 2a thereof is open. A flange section 2b protruding to the outside of the housing 2 is provided in the end section 2a of the housing 2. The flange section 2b presents a circular shape and is provided so as to surround a periphery of the end section 2a of the housing 2.

For example, the housing 2 is provided in an interior of the vehicle such as the automobile or the railway vehicle.

For example, the housing 2 may be provided inside the opening that is provided in the ceiling of the passenger compartment of the automobile. In this case, the flange section 2b is provided in the vicinity of the periphery of the opening provided in the ceiling.

The light emitting section 3 is provided in a bottom surface 2c of the inside of the housing 2.

A side surface 2d of the inside of the housing 2 is inclined. The side surface 2d is inclined in a direction in which the side of the bottom surface 2c is close to the center of the housing 2.

As illustrated in FIG. 2, some of light emitted from a light emitting element 3b of the light emitting section 3 is incident on the side surface 2d. The light incident on the side surface 2d is reflected and emitted to the outside of the lighting device 1 through the cover 6.

Here, for example, if the side surface 2d is a plane perpendicular to the bottom surface 2c, some of the light incident on the side surface 2d is unlikely to be emitted to the outside of the lighting device 1.

In the embodiment, the side surface 2d is inclined in the direction in which the side of the bottom surface 2c is close to the center of the housing 2. Thus, the light incident on the side surface 2d is likely to be emitted to the outside of the lighting device 1.

A material of the housing 2 is not specifically limited. For example, the housing 2 may be formed using a resin material, a metal material, or the like.

In this case, in view of the fact that some of the light emitted from the light emitting element 3b of the light emitting section 3 is incident on the side surface 2d, it is preferable that the material of the housing 2 be a material having a high reflectivity with respect to the light emitted from the light emitting element 3b.

For example, as the material having the high reflectivity, a white resin, a resin in which particles such as titanium oxide or the like are mixed, and the like may be exemplified.

Furthermore, if a heat value of the light emitting element 3b or the like provided in the light emitting section 3 is large, it is preferable that the material of the housing 2 be a material having high thermal conductivity.

For example, as the material having high thermal conductivity, a high thermal conductive resin, a meal, ceramics such as aluminum oxide or aluminum nitride, and the like may be exemplified.

Moreover, for example, the high thermal conductive resin is a material in which fiber and particles formed of carbon, aluminum oxide, or the like having high thermal conductivity are mixed with a resin such as Polyethyleneterephthalate (PET) or nylon.

The light emitting section 3 has a substrate 3a, the light emitting element 3b, and a switch 3c.

The substrate 3a presents a plate shape and has a wiring pattern (not illustrated) on a surface thereof.

For example, the substrate 3a may be formed of ceramics such as aluminum oxide or aluminum nitride, an organic material such as paper phenol or glass epoxy, a material in which a surface of the metal plate is covered by an insulating material, or the like.

Moreover, if the surface of the metal plate is covered by the insulating material, the insulating material may be formed of an organic material and may be formed of an inorganic material.

If the heat value of the light emitting element 3b or the like is large, in the view of heat radiation, it is preferable that the substrate 3a be formed using the material having high thermal conductivity. For example, as the material having high thermal conductivity, ceramics such as aluminum oxide or aluminum nitride, the high thermal conductive resin described above, a material in which the surface of the metal plate is covered by the insulating material, and the like may be exemplified.

Furthermore, the substrate 3a may be a single-layer and may be a mufti-layer.

The light emitting element 3b is provided on the substrate 3a.

For example, the light emitting element 3b may be a light emitting diode, a laser diode, and the like.

The number of the light emitting element 3b is not specifically limited. The number of the light emitting element 3b may be appropriately changed depending on usage, size or the like of the lighting device 1. That is, the number of the light emitting element 3b may be one or more.

If a plurality of light emitting elements 3b are provided, arrangement of the plurality of light emitting elements 3b may be regularly arranged in a shape such as a matrix shape or a concentric circular shape, and may be arranged arbitrarily.

A connection method between the light emitting element 3b and the wiring pattern (not illustrated) provided on the surface of the substrate 3a is not specifically limited. For example, the light emitting element 3b may be electrically connected to the wiring pattern (not illustrated) through a wire. Furthermore, for example, the light emitting element 3b may be mounted by a Chip On Board (COB) that is directly connected to the wiring pattern (not illustrated).

Furthermore, as illustrated in FIG. 2, the light emitting element 3b may be directly provided on the substrate 3a. Furthermore, for example, the light emitting element 3b may also be provided on the substrate 3a through an envelope, like a Plastic Leaded Chip Carrier (PLCC) type or the like.

Furthermore, if necessary, a circular reflector surrounding the light emitting element 3b may be provided, the light emitting element 3b may be sealed by a resin, and a phosphor may be included in the resin sealing the light emitting element 3b.

The switch 3c is provided on the substrate 3a. The switch 3c is electrically connected to the wiring pattern (not illustrated) provided on the surface of the substrate 3a.

For example, the switch 3c may be a slide switch.

Furthermore, a lighting state of the light emitting element 3b, that is, a lighting state of the lighting device 1 may be selected by sliding a knob 3c1 provided in the switch 3c left and right. For example, light on, light off, and a door interlock state to perform light on and light off depending on the opening and closing of a door of the vehicle may be selected.

Furthermore, if necessary, the substrate 3a may appropriately have a circuit part such as a resistor, a capacitor, and a diode.

The wiring pattern (not illustrated) of the substrate 3a is connected an end of a power supply terminal (not illustrated). The other end of the power supply terminal (not illustrated) is exposed from the housing 2. A power supply of the outside or the like is connected to the power supply terminal (not illustrated) exposed from the housing 2 through a socket or the like (not illustrated).

The frame 4 is provided on the side (the side of the opening) of the end section 2a of the housing 2.

As illustrated in FIG. 3, the frame 4 has an edge section 4a and a holding section 4b.

The edge section 4a presents a frame shape. Claw sections 4a1 are provided in the edge section 4a. A leading end of the claw section 4a1 protrudes toward the center of the frame 4 and can hold the flange section 2b of the housing 2. As illustrated in FIGS. 4A and 4B, the frame 4 is fixed on the side of the end section 2a of the housing 2 by the claw sections 4a1.

One end of the holding section 4b is provided in the edge section 4a and the other end of the holding section 4b protrudes toward the center of the frame 4. A hole section 4b1 for mounting the operation section 5 is provided in the holding section 4b. The hole section 4b1 has a shape extending in a predetermined direction. A guide section (not illustrated) is provided inside the hole section 4b1, holds the operation section 5, and is adapted to slide the operation section 5 along the hole section 4b1.

Moreover, as illustrated in FIG. 1, the edge section 4a is provided under the cover 6. That is, the cover 6 covers the edge section 4a. Thus, it is possible to increase an area of the cover 6 that is an irradiation surface of the light.

That is, according to the embodiment, it is possible to increase an irradiation area.

The holding section 4b is exposed from the cover 6. Thus, it is easy to merge the holding section 4b into the design of an interior material of the vehicle by changing a color, a shape, or the like of the holding section 4b.

As described above, it is preferable that the housing 2 be formed of a material having high reflectivity of light or a material having high thermal conductivity. However, if the housing 2 formed of the material having high reflectivity of light or the material having high thermal conductivity is exposed, it is difficult to be merged into the design of the interior material of the vehicle.

Meanwhile, if only the cover 6 is exposed, there is a concern that improvement of the design may not be achieved.

According to the embodiment, it is possible to form the housing 2 with the material having high reflectivity of light or the material having high thermal conductivity, and to form the frame 4 having the holding section 4b exposed from the cover 6 with various materials.

For example, it is possible to form the frame 4 using a material having a color or a texture that matches the design of the interior material of the vehicle.

That is, the frame 4 has at least one of the same color, the same texture and the same patterns as the interior material of an interior in which the lighting device 1 is provided.

In this case, it is possible to select the material of the frame 4 from various materials such as a metal material, a resin material, and ceramics.

Furthermore, it is possible to be merged into various designs of the interior material of the vehicle by replacing only the frame 4.

The operation section 5 is provided inside the hole section 4b1. One end of the operation section 5 protrudes from the holding section 4b. A concave section (not illustrated) is provided in the other end of the operation section 5. The knob 3c1 of the switch 3c is inserted into the concave section (not illustrated). Thus, it is possible to slide the knob 3c1 of the switch 3c by sliding the operation section 5.

It is possible to select the lighting state of the lighting device 1 described above by sliding the operation section 5 along the hole section 4b1. For example, if the operation section 5 moves to the left side, it becomes the on state, if the operation section 5 moves to the center, it becomes the door interlock state, and if the operation section 5 moves to the right side, it becomes the off state of the lighting device 1.

In this case, the operation section 5 is held in the holding section 4b. Thus, it is possible to suppress a force applied to the operation section 5 to be transmitted to the switch 3c. As a result, it is possible to suppress breakage of the switch 3c.

The material of the operation section 5 is not specifically limited and, for example, it is possible to use various materials such as a metal material, a resin material, and ceramics.

The cover 6 is provided on the frame 4. In this case, the cover 6 is provided so as to cover the edge section 4a of the frame 4 and the opening of the frame 4.

The cover 6 has a notch section 6a. The holding section 4b of the frame 4 is provided inside the notch section 6a. Thus, it is possible to expose the holding section 4b of the frame 4 from the cover 6.

The cover 6 has a curved shape of which the center is convex. However, the shape of the cover 6 is not limited to the example and it is possible to change the shape appropriately depending on the usage of the lighting device 1, the design of the interior material of the vehicle, or the like.

The cover 6 is provided to suppress glare. Thus, the cover 6 lowers transmittance of the light in order to weaken strength of the incident light.

For example, a diffusion treatment such as blasting is applied to at least one of an incident surface and an irradiation surface of the cover 6 or a scattering layer including a scattering material is provided in at least one of the incident surface and the irradiation surface of the cover 6 so that the transmittance of the light is lowered.

Furthermore, it is possible to lower the transmittance of the light by forming the cover 6 from a translucent material including the scattering material.

For example, the scattering material may be a material in which particles having a refractive index different from that of the translucent material is added to the translucent material. For example, the particle may be a particle made of titanium oxide and the like.

In this case, if a linear transmittance of the light in the cover 6 is 60% or less, it is possible to effectively suppress the glare.

Furthermore, if the linear transmittance of the light in the cover 6 is 30% or more and 50% or less, it is possible to effectively suppress the glare without damage to a function as the lighting device.

Furthermore, as illustrated in FIG. 4B, the cover 6 has claw sections 6b protruding toward the side of the frame 4.

A leading end of the claw section 6b protrudes toward the outside of the cover 6 and is adapted to hold the edge section 4a of the frame 4. As illustrated in FIGS. 4A and 4B, the cover 6 is fixed to the edge section 4a of the frame 4 by the claw sections 6b.

Figure 5A:
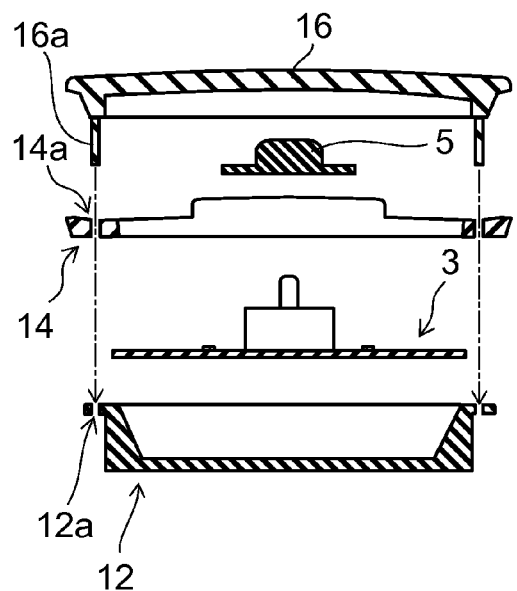
FIGS. 5A and 5B are schematic cross-sectional views illustrating mounting of a cover and a frame according to another embodiment.
Figure 5B:
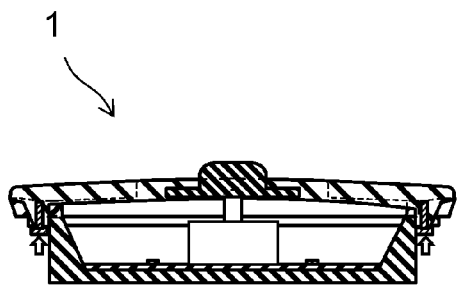

FIGS. 5A and 5B are schematic cross-sectional views illustrating mounting of a cover 16 and a frame 14 according to another embodiment.

Moreover, FIG. 5A is a schematic exploded cross-sectional view illustrating before mounting of the cover 16 and the frame 14. FIG. 5B a schematic cross-sectional view illustrating after mounting of the cover 16 and the frame 14.

As illustrated in FIG. 5A, the cover 16 has a plurality of connection sections 16a protruding toward the side of a housing 12. The connection section 16a presents a rod shape.

The frame 14 has hole sections 14a in positions corresponding to the connection sections 16a.

The housing 12 has hole sections 12a in positions corresponding to the connection sections 16a.

When the cover 16 and the frame 14 are mounted on the housing 12, first, the connection sections 16a are inserted into the hole sections 14a and the hole sections 12a.

Next, as illustrated in FIG. 5B, the cover 16 and the frame 14 are mounted on the housing 12 by crushing the leading end of the connection sections 16a.

For example, if the connection section 16a is formed of a metal material, the cover 16 and the frame 14 are mounted on the housing 12 by caulking the leading end of the connection sections 16a.

If the connection section 16a is formed of a resin material, the cover 16 and the frame 14 are mounted on the housing 12 by heating, softening and crushing the leading end of the connection sections 16a.

Figure 6:
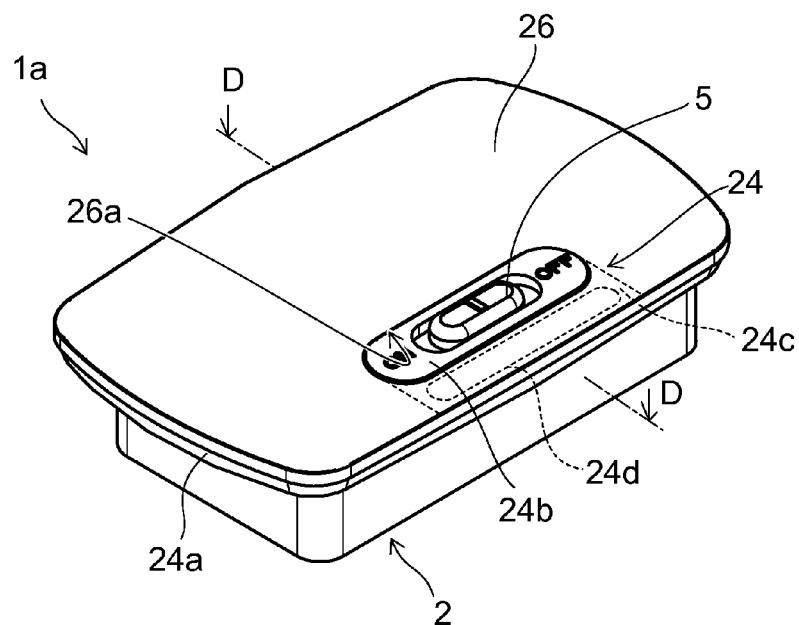
FIG. 6 is a schematic perspective view illustrating a lighting device according to another embodiment.

FIG. 6 is a schematic perspective view illustrating a lighting device 1a according to another embodiment.

Figure 7:
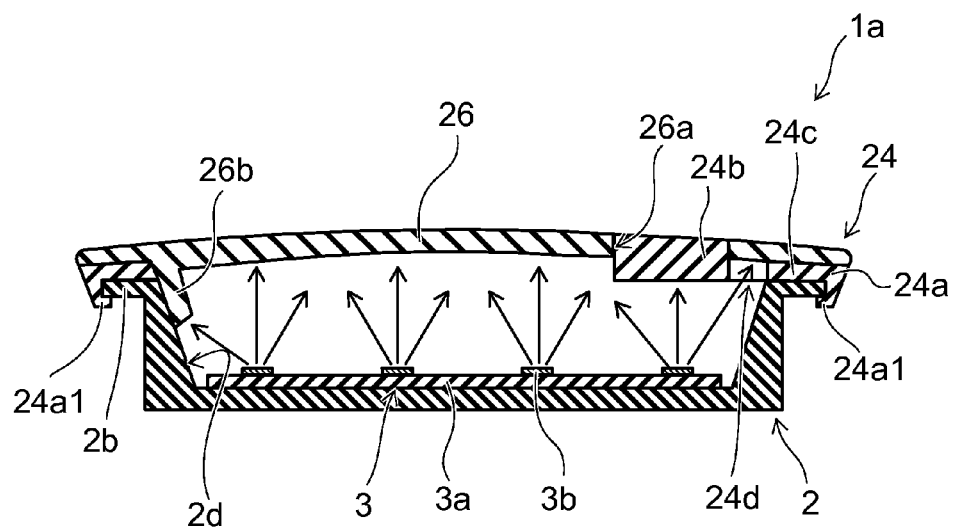
FIG. 7 is a schematic cross-sectional view in a direction taken along line D-D in FIG. 6.

FIG. 7 is a schematic cross-sectional view in a direction taken along line D-D in FIG. 6.

As illustrated in FIGS. 6 and 7, the lighting device 1a has a housing 2, a light emitting section 3, a frame 24, an operation section 5, and a cover 26.

The frame 24 has an edge section 24a, a holding section 24b, and a connection section 24c.

The edge section 24a presents a frame shape. Claw sections 24a1 are provided in the edge section 24a. The claw section 24a1 may be similar to the claw section 4a1 described above.

The holding section 24b may be similar to the holding section 4b described above. However, the holding section 24b is exposed at a position away from a periphery of the cover 26.

The connection section 24c is provided between the holding section 24b and the edge section 24a. The connection section 24c has a hole section 24d passing through in a thickness direction.

The cover 26 is provided on the frame 24 and covers the connection section 24c.

The cover 26 has a hole section 26a. The holding section 24b of the frame 24 is provided inside the hole section 26a. Thus, it is possible to expose the holding section 24b of the frame 24 from the cover 26.

Furthermore, as illustrated in FIG. 7, the cover 26 has a light guide section 26b. The light guide section 26b extends toward the light emitting section 3 along the side surface 2d of the housing 2.

Some of the light emitted from the light emitting element 3b of the light emitting section 3 is incident to the cover 26 through the hole section 24d.

Thus, it is possible to minimize the light that is blocked by the holding section compared to the holding section 4b of the frame 4 described above.

Furthermore, some of the light emitted from the light emitting element 3b of the light emitting section 3 is incident on the light guide section 26b and is propagated to the inside of the light guide section 26b and then reaches the vicinity of the periphery of the cover 26.

Thus, it is possible for the light to effectively reach the vicinity of the periphery of the cover 26.

The light that reached the vicinity of the periphery of the cover 26 is emitted toward outside from the vicinity of the periphery of the cover 26.

According to the embodiment, it is possible to further increase the irradiation area.

Moreover, it is also possible to provide the light guide section 26b to the covers 6 and 16 described above.

Figure 8:
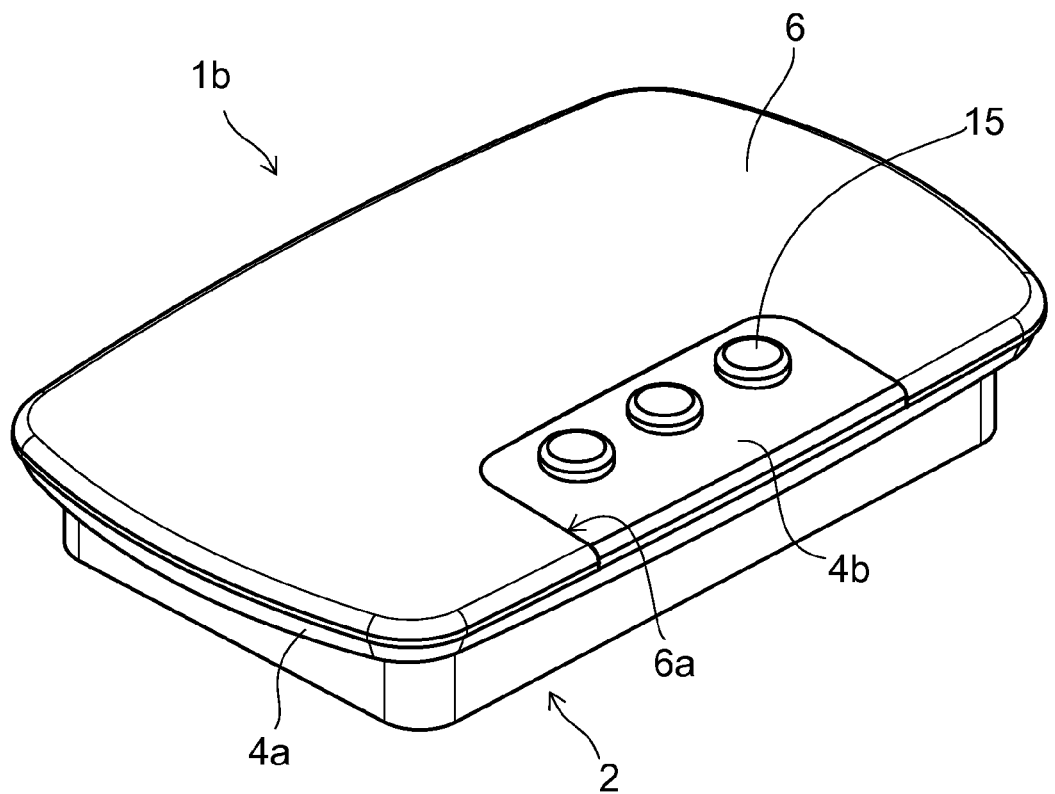
FIG. 8 is a schematic perspective view illustrating a lighting device according to still another embodiment.

FIG. 8 is a schematic perspective view illustrating a lighting device 1b according to still another embodiment.

Figure 9:
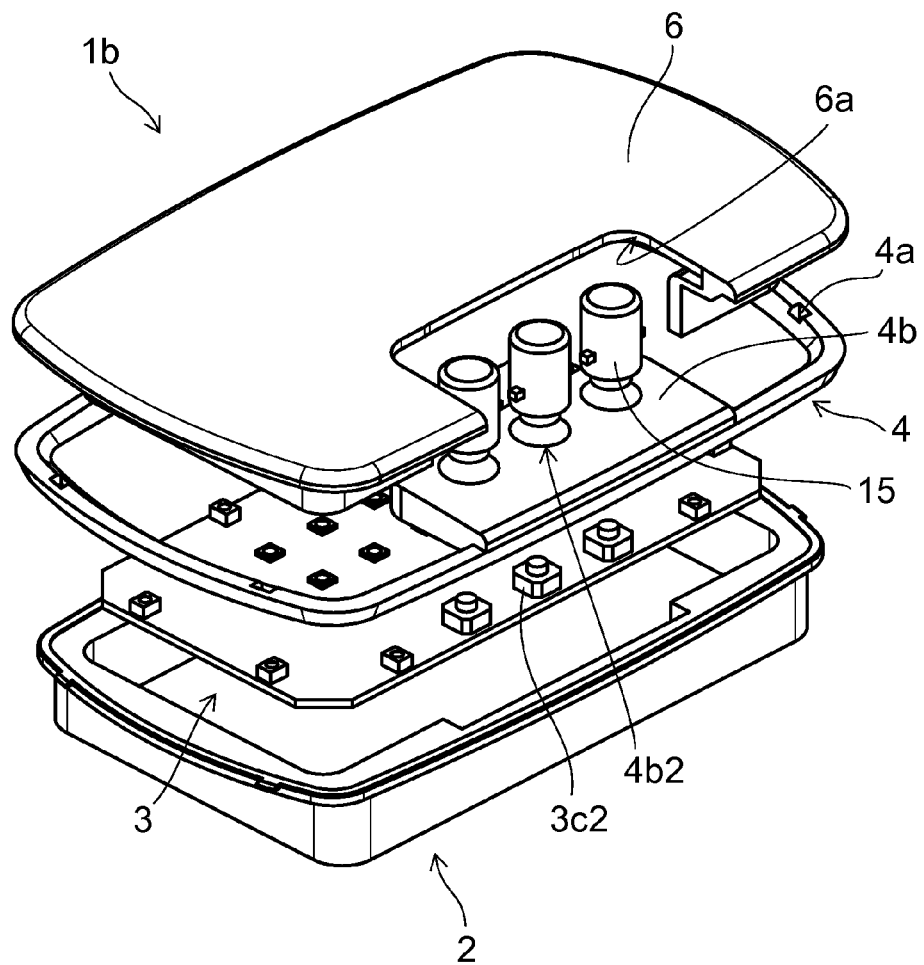
FIG. 9 is a schematic exploded view of the lighting device.

FIG. 9 is a schematic exploded view of the lighting device 1b.

As illustrated in FIGS. 8 and 9, the lighting device 1b has a housing 2, a light emitting section 3, a frame 4, an operation section 15, and a cover 6.

One slide switch is provided in the lighting device 1 described above. On the other hand, three switches 3c2 which are tactile switches are provided in the lighting device 1b.

Furthermore, one sliding operation section 5 is provided in the lighting device 1 described above. On the other hand, three operation sections 15 moving in a thickness direction of the lighting device 1b are provided in the lighting device 1b.

Furthermore, one hole section 4b1 extending in a predetermined direction for mounting the operation section 5 is provided in the lighting device 1 described above. On the other hand, three hole sections 4b2 for mounting the operation section 15 are provided in the lighting device 1b.

As described above, the shape or the number of the switches is not specifically limited and may be appropriately changed depending on the usage of the lighting device and the like.

Figure 10:
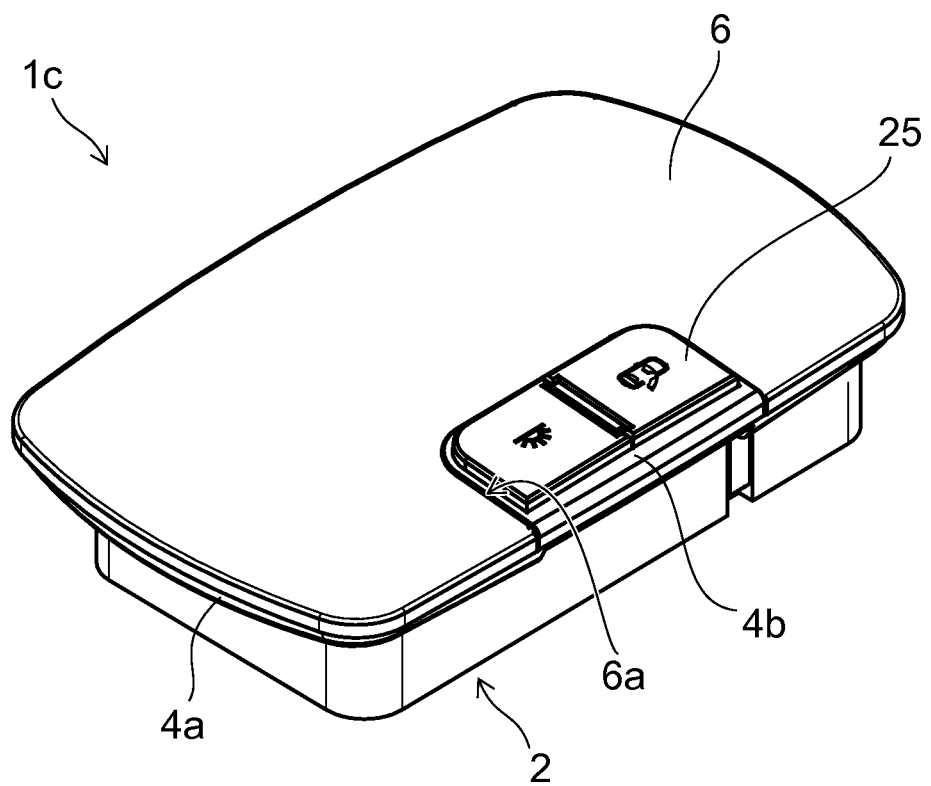
FIG. 10 is a schematic perspective view illustrating a lighting device according to still another embodiment.

FIG. 10 is a schematic perspective view illustrating a lighting device 1c according to still another embodiment.

Figure 11:
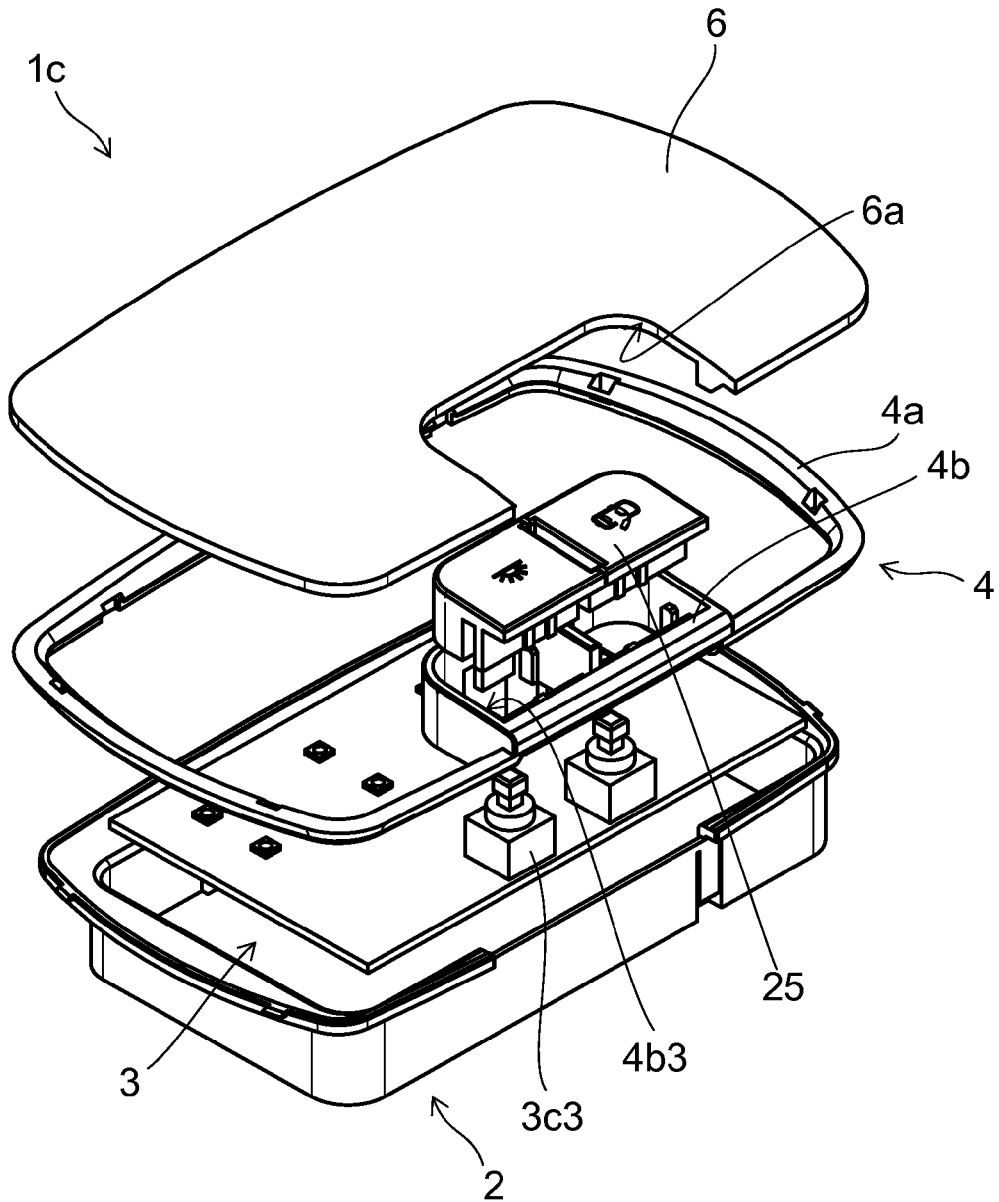
FIG. 11 is a schematic exploded view of the lighting device.

FIG. 11 is a schematic exploded view of the lighting device 1c.

As illustrated in FIGS. 10 and 11, the lighting device 1c has a housing 2, a light emitting section 3, a frame 4, an operation section 25, and a cover 6.

Three switches 3c2 which are the tactile switches are provided in the lighting device 1b described above. On the other hand, two switches 3c3 which are illumination type switches are provided in the lighting device 1c.

Furthermore, three operation sections 15 are provided in the lighting device 1b described above. On the other hand, two operation sections 25 are provided in the lighting device 1c.

Furthermore, three hole sections 4b2 for mounting the operation section 15 are provided in the lighting device 1b described above. On the other hand, one hole section 4b3 for mounting the operation section 25 is provided in the lighting device 1c.

As described above, the type or the number of the switches is not specifically limited and may be appropriately changed depending on the usage of the lighting device and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, the above-mentioned embodiments can be combined mutually and can be carried out.

What is claimed is:

1. A lighting device comprising:
a light emitting section that has a light emitting element and a switch for controlling a lighting state of the light emitting element;
a housing that stores the light emitting section and of which one end section is open;
a cover that covers the opening of the housing and has translucency; and
a frame that is provided between the housing and the cover, wherein the frame includes:
an edge section that presents a frame shape;
a holding section of which one end is provided in the edge section and another end protrudes from the edge section and which holds an operation section operating the switch and is exposed from the cover; and
a connection section provided between the holding section and the edge section, wherein the connection section has a hole section passing therethrough in a thickness direction, and the cover covers the connection section.

2. The device according to claim 1, wherein the cover further has a light guide section extending toward the light emitting section.

3. The device according to claim 2, wherein some of the light emitted from the light emitting section is incident on the light guide section and is propagated to the inside of the light guide section, and is emitted from the vicinity of a periphery of the cover.

4. The device according to claim 1, wherein some of the light emitted from the light emitting element is incident on the cover through the hole section.

5. The device according to claim 1, wherein a side surface of the inside of the housing is inclined in a direction in which the side of a bottom surface is close to the center of the housing.

6. The device according to claim 1, wherein the cover covers the edge section.

7. The device according to claim 1,
wherein the cover has a notch section, and
wherein the holding section is provided inside the notch section.

8. The device according to claim 1, wherein the cover has a curved surface shape of which a center is convex.

9. The device according to claim 1, wherein the cover weakens the light that is emitted from the light emitting element and is incident on the cover.

10. The device according to claim 9, wherein linear transmittance of the light of the cover is 60% or less.

11. The device according to claim 9, wherein linear transmittance of the light of the cover is 30% or more and 50% or less.

12. The device according to claim 1, wherein the cover further has a claw section that protrudes toward a side of the frame and holds the edge section.

13. The device according to claim 1, wherein the lighting state of the light emitting element is one of a light on, a light off, and a door interlock state to perform the light on and light off depending on the opening and closing of a door of a vehicle.

14. The device according to claim 1, wherein the light emitting element is at least one of a light emitting diode and a laser diode.

15. The device according to claim 1, wherein the switch is at least one of a slide switch, a tactile switch, and an irradiation type switch.

16. The device according to claim 1, wherein the housing is provided in an interior of a vehicle.

* * * * *